United States Patent Office 3,298,717
Patented Jan. 17, 1967

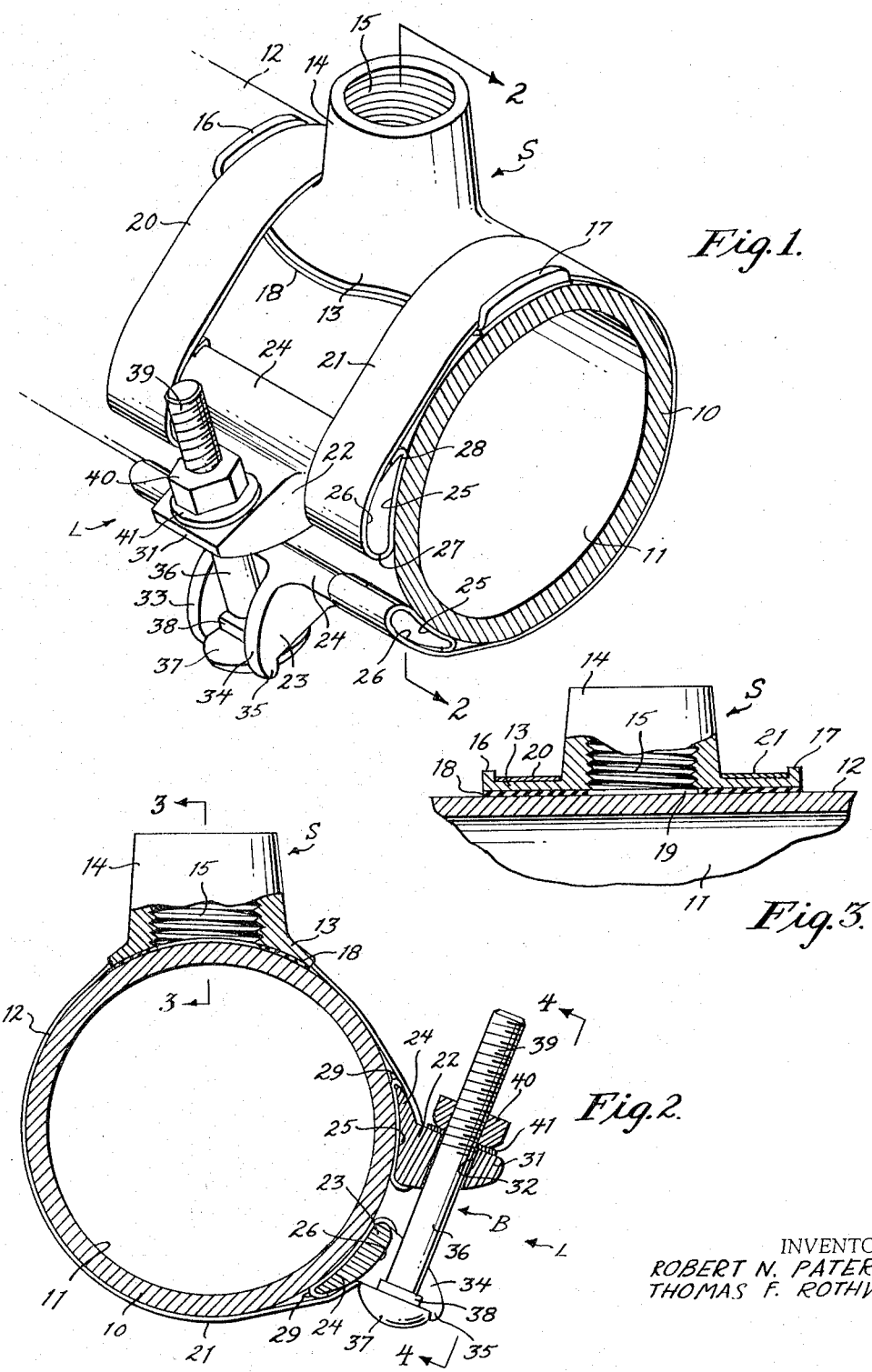

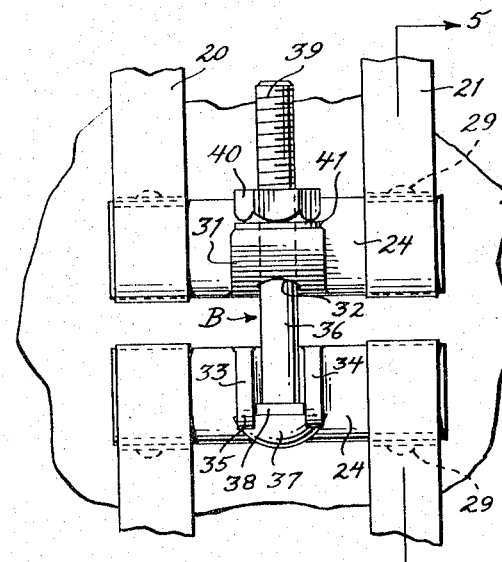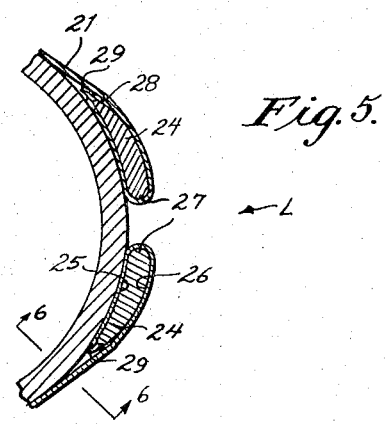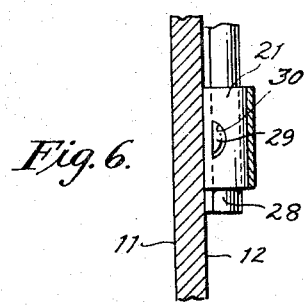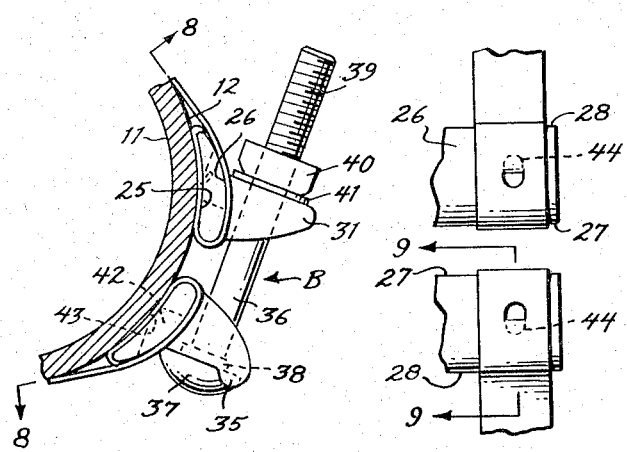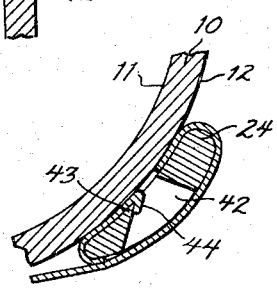

3,298,717
WATER SERVICE AND REPAIR SADDLE
Thomas F. Rothwell and Robert N. Paterson, both of Bradford, Pa., assignors to Dresser Industries, Inc., Dallas, Tex., a corporation of Delaware
Continuation of application Ser. No. 148,353, Oct. 30, 1961. This application Oct. 20, 1965, Ser. No. 507,601
2 Claims. (Cl. 285—197)

This application is a continuation of my copending application Serial Number 148,353, filed October 30, 1961, and now abandoned.

This invention relates to saddles of the type commonly employed for water service purposes, and more particularly to the means for anchoring such a saddle in position on a pipe.

A saddle of the type with which this invention is concerned ordinarily comprises a base or pedestal that is curved to conform to the curvature of the pipe or main on which it is to be mounted. Upstanding from the central portion of the base and formed integrally therewith is a short conduit or collar having an internally threaded bore. A packing element such as a gasket of sheet material is interposed between the base and the pipe and has an opening in alignment with the bore aforesaid.

In the past, various types of mechanisms and devices have been employed for securing a saddle such as described above in position on the pipe or main. The primary function which such an anchoring device must achieve is to apply pressure to the base so that the gasket is compressed to the extent necessary for sealing purposes. It has been known, as shown, for example, by the Montgomery Patent No. 2,703,721, to secure the saddle by means of a pair of separately tensioned straps or bolts. A problem encountered in such an arrangement, however, is that if the straps or bolts are not tensioned the same amount, an unevenness will result which can cause leakage. It had been recognized in the prior art that uneven sealing could be avoided by the expedient of providing a single tightening means. Such an approach is exemplified by Mueller Patent No. 1,459,030, wherein semicircular rigid steel members were tightened as two halves of a clamp to force the saddle against the pipe. Pipe service and repair saddles are commonly used on asbestos-cement and corroded metal pipe, both of which are weak and brittle. Any arrangement wherein a clamping action is involved, as in the Mueller patent, cannot be safely used on these weak and brittle pipes because of the possibility that the pipe will be crushed if the saddle is overtightened. In addition to factors of evenness of sealing and avoidance of crushing certain types of pipe, there is the factor of simplifying the design and installation of saddles. Also, it is desirable to reduce material and manufacturing costs.

Accordingly, it is an object of this invention to provide an improved pipe service and repair saddle wherein evenness of sealing pressure is ensured, and which can be used on asbestos-cement or other weaker types of pipe without danger of damage to the pipe.

It is a further object of this invention to provide a saddle which is economical in cost of construction and which can be installed easily and quickly.

In accordance with this invention, the above objects are attained by an assembly in which a pair of flexible sheet metal straps substantially fully encircle the pipe. These straps pass over opposite sides of the outlet connection and are anchored to a common pair of lug elements which are drawn together by a single tangentially acting bolt. The straps are simply anchored by wrapping or bending of the ends around projecting portions of each lug element. The combination of these features affords advantages not heretofore available in any commercially available saddle. By virtue of the single tightening means, the saddle cannot be unevenly sealed against the pipe. The flexible straps, girdling the pipe completely, and with the absence of any rigid clamp-like action, ensures that a workman will be unable to crush the pipe by inadvertently overtightening the assembly. Finally, this single bolt tightening assembly is quickly and easily installed, and the overall design is simple and of low cost.

For a full and more complete understanding of the invention, reference may be had to the following description and accompanying drawings wherein:

FIGURE 1 is a perspective view of a pipe or main illustrating a saddle that is mounted thereon in accordance with the precepts of this invention.

FIGURE 2 is a transverse radial section through the saddle, pipe and anchoring mechanism, being taken about on the plane represented by the line 2—2 of FIGURE 1.

FIGURE 3 is a detailed section through the saddle proper and the adjacent portion of the pipe, being taken about on the plane represented by the line 3—3 of FIGURE 2.

FIGURE 4 is a detailed elevation of the lug assembly and is taken about on the plane represented by line 4—4 of FIGURE 2.

FIGURE 5 is a detailed section through the lug assembly being taken on the plane represented by the line 5—5 of FIGURE 4.

FIGURE 6 is another detailed section through the pipe between the elements of the lug assembly and is taken about on the plane represented by the line 6—6 of FIGURE 5.

FIGURE 7 is a detail depicting a modified arrangement for securing the band ends to the lugs. In this view, the pipe is shown in section and the lugs in elevation.

FIGURE 8 is a detailed elevation of the under face of the lugs being taken about on the planes represented by the line 8—8 of FIGURE 7, and FIGURE 9 is a detailed section through one of the lugs being taken about on the plane represented by line 9—9 of FIGURE 8.

Referring now to the drawings wherein like reference characters denote corresponding parts and first more particularly to FIGURES 1, 2 and 3, a pipe or main is shown at 10 and has a bore 11 and an outer surface 12. A saddle proper is referred to in its entirety by the reference character S. The saddle S is made of metal commonly employed for such purposes and comprises a base or pedestal 13 which is curved to conform to the curvature of the outer face 12 of the pipe. Upstanding from the central portion of the base 13 is a short conduit or collar 14 which is formed integrally with the base 13 and which has an internally threaded bore 15. This conduit 14 is in the nature of a collar that is used in effecting a connection to the saddle.

The base 13 includes lateral portions extending from each side of the conduit 14 that terminate in flanges 16 and 17. These flanges 16 and 17 co-operate with the conduit 14 in defining guideways for positioning anchoring straps as will be later described.

A packing in the form of a sheet gasket 18 is interposed between the under face of the base 13 and the outer face 12 of the pipe. The gasket 18 is formed with an opening 19 in alignment with the threaded bore 15.

A pair of thin anchoring straps are designated 20 and 21. These straps are preferably of stainless steel although they may be made of any sheet material having the required properties of strength and flexibility. It will be noted that the strap 20 passes between the flange 16 and the conduit 14 while the strap 21 passes between the flange 17 and the conduit 14.

A lug assembly is referred to in its entirety by the reference character L. Lug assemblies of this same general type are now employed in pipe repair clamps to draw the two ends of a band together about a pipe. The lug assembly L comprises two members 22 and 23. Each of these members 22 and 23 includes a base 24 having a longitudinal extent substantially equal to the lateral dimension of the base 13 of the saddle S, that is the bases 24 are co-extensive with the base 13. Each of these bases 24 has an under face 25 having a curvature corresponding to the curvature of the pipe surface 12 and a convex outer face 26 with the two faces being joined by a curved nose or leading edge 27 and a trailing edge 28. Each trailing edge 28 of each base 24 is formed with a pair of protuberances or projections 29.

Each of the bands 20 and 21 adjacent to each end thereof is formed with an opening corresponding in shape to one of these projections 29 which is received therein. Each of these openings is designated 30.

It is evident that the anchorage of one end of each band 20 and 21 to the base 24 of the lug elements is achieved by the band first passing over the outer convex surface 26 of the lug and around the nose edge 27. The band is continued around the nose edge 27 and along the under face 25 whereupon it is turned back around the trailing edge 28 and tucked in or inserted between the under face of the band and the outer face 26 of the base. At the trailing edge 28 the projections 29 are received in the openings 30. It is notable that each lug base 24 is common to both of the bands 20 and 21.

Outstanding from the base 24 of lug member 22 and substantially centrally thereof is an ear 31 formed with a bolt opening 32 (see FIGURE 2). Outstanding from the base 24 of the lug member 23 and substantially centrally thereof are a pair of spaced webs 33 and 34, the outer corners of which are continued in a circumferential direction to provide overhanging tabs 35. A bolt B has a shank 36 which passes through the opening 32 in the ear 31 and between the webs 33 and 34. At one end the bolt B has a head 37 that is engaged and retained in position by the overhanging tabs 35. Between the head 37 and the shank 36 there is a noncircular portion such as the square 38 which engages the inner faces of the webs 33 and 34 to hold the bolt B against rotation. The other end of the bolt is threaded as indicated at 39 with the threaded portion carrying the nut 40. A washer 41 is interposed between the nut 40 and the ear 31.

It is evident that as the nut 40 is tightened on the bolt B the lug elements 22 and 23 are drawn together to exert tension on the ends of the bands 20 and 21 and thus securely clamp the base 13 of the saddle S together with the gasket 18 against the outer surface 12 of the pipe. It is further evident that the single bolt and lug assembly is common to the two straps thus only a single tightening operation is required.

*The modification*

A modified arrangement for securing the ends of the bands to the lug bases is depicted in FIGURES 7, 8 and 9. In this form of the invention, each lug base 24 is formed with a pair of recesses 42 which open onto the under face 25 of the lug and which define lips or edges 43. A tang or tab 44 is struck from each band edge and bent backward into the hook formation depicted in FIGURE 9. This hooked tab engages the edge 43. Each band end is passed over the convex face 26 of each lug base, around the nose edge 27 along the under face 25 and is tucked in over the trailing edge 28 in the manner above described with the hook tang 44 engaging the edge 43 of each recess 42.

While certain specific embodiments of the invention are hereinbefore set forth, it is to be clearly understood that the invention is not to be limited to the exact instructions, mechanisms and devices illustrated and described because various modifications of these details may be provided in putting the invention into practice within the purview of the appended claims.

What is claimed is:

1. A service and repair saddle for frangible pipe such as asbestos cement pipe, said saddle comprising a saddle body having a cylindrical undersurface adapted to fit the cylindrical curvature of the pipe on which the saddle is to be mounted and a centrally upstanding collar providing an outlet connection and opening, said saddle body having portions with cylindrical outer surfaces on opposite sides of said collar, gasket means on said saddle body undersurface extending substantially to the periphery thereof and adapted to provide a seal around said outlet connection and a seat for said saddle body on the pipe, a pair of axially spaced sheet metal bands adapted to substantially fully encircle the pipe and passing over said cylindrical outer surfaces respectively of said saddle body on opposite sides of said collar, a single pair of lug members each having an elongated base portion with a concave undersurface adapted to fit the pipe, a nose portion, a convex outer face and a trailing edge, and a central ear portion projecting outwardly from said base portion and having a bolt opening, each of said bands having opposite end portions passing over the outer faces of said base portion of said lugs respectively and bent over the nose portion and back under the under face of said base portion, said bands being on opposite sides of said central ear portions, means securing the end portions of said bands to said lugs against tension on said bands and against movement longitudinally off of said base portions of said lugs, a single bolt means extending freely through said bolt openings of said ear portions and connecting said lugs centrally thereof, said bolt means being adapted to be tightened to tension said bands and thereby draw said saddle body toward the pipe and apply uniform pressure to said gasket to effect a seal and to mount said saddle stably on said pipe, said lugs being circumferentially spaced from said saddle body and said lugs being tiltable relative to said bolt means to apply tension uniformly to said bands and afford uniformly distributed pressure of said bands on said pipe to avoid rupture of said frangible pipe.

2. A service and repair saddle according to claim 1 in which each of said end portions of each of said bands passes more than once around the base portion of the respective lug, being bent over said trailing edge and having a portion disposed between the outer surface of said base portion and an overlying portion of said band.

References Cited by the Examiner

UNITED STATES PATENTS

| | | | |
|---|---|---|---|
| 1,459,030 | 6/1923 | Mueller | 285—199 |
| 2,703,721 | 3/1955 | Montgomery | 285—197 |
| 2,908,061 | 10/1959 | Adams | 24—279 |
| 2,945,277 | 7/1960 | Wiora | 24—281 |
| 3,120,965 | 2/1964 | MacDonald | 285—197 X |

FOREIGN PATENTS

| | | |
|---|---|---|
| 147,060 | 9/1936 | Austria. |
| 573,695 | 12/1945 | Great Britain. |
| 147,080 | 9/1954 | Sweden. |

CARL W. TOMLIN, *Primary Examiner.*

THOMAS F. CALLAGHAN, *Examiner.*